UNITED STATES PATENT OFFICE.

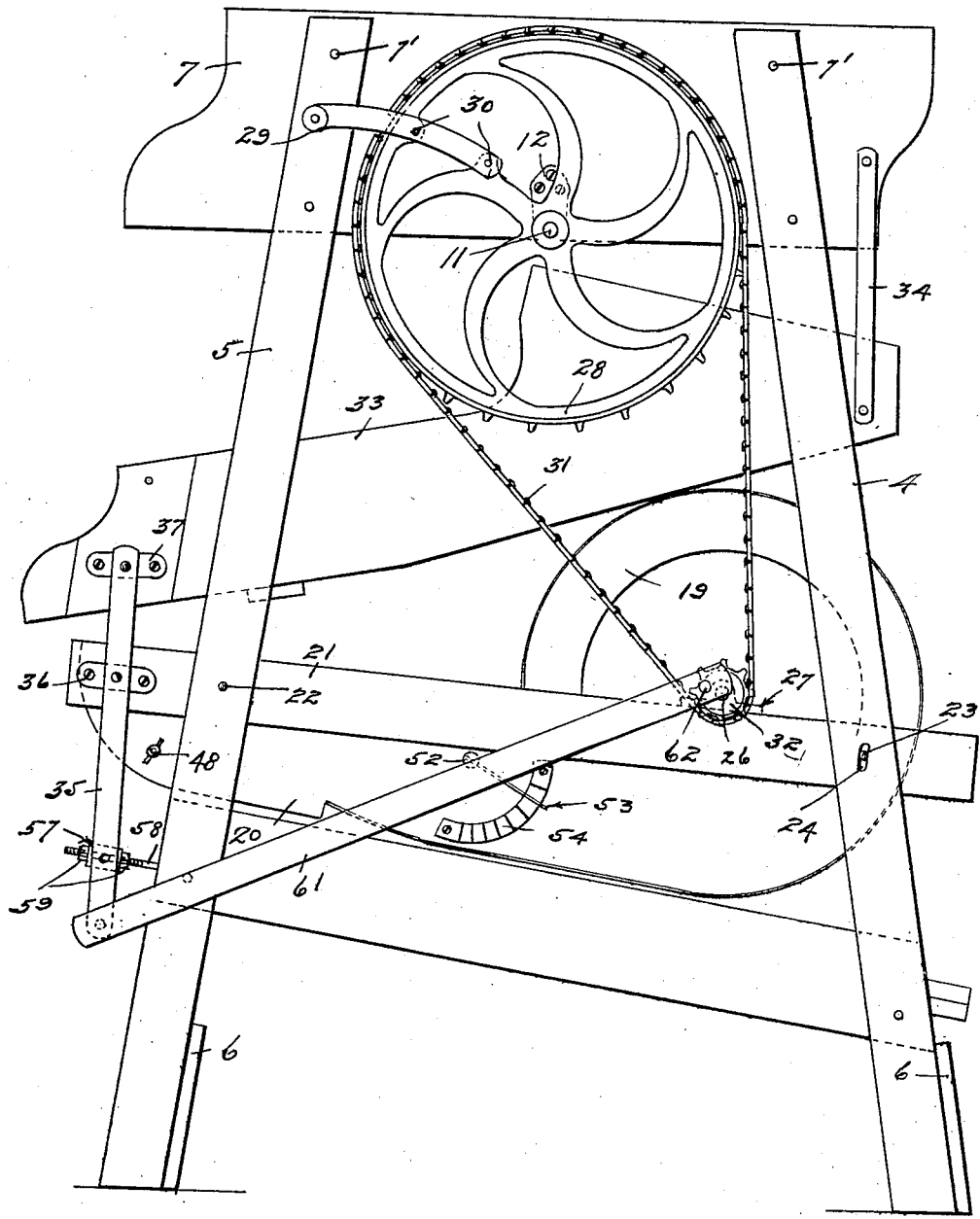

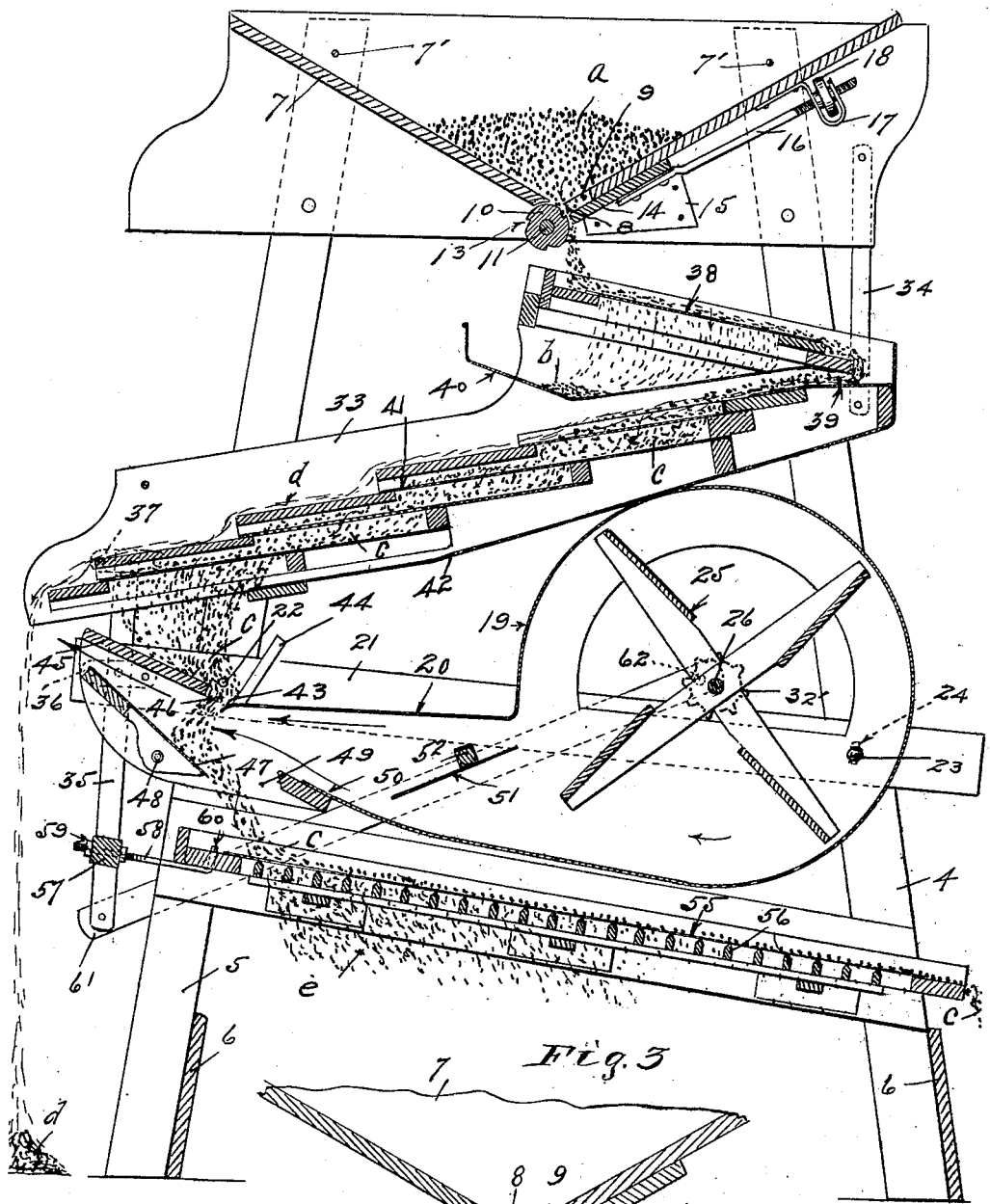

PATRICK H. VAUGHN, OF MORRIS, MINNESOTA.

GRAIN-SEPARATOR.

1,321,263.  Specification of Letters Patent.  Patented Nov. 11, 1919.

Application filed February 8, 1919. Serial No. 275,793.

*To all whom it may concern:*

Be it known that I, PATRICK H. VAUGHN, a citizen of the United States, residing at Morris, in the county of Stevens and State of Minnesota, have invented certain new and useful Improvements in Grain-Separators; and I do hereby declare the following to be a full, clear, and exact description of the invention, such as will enable others skilled in the art to which it appertains to make and use the same.

My invention relates to improvements in grain separators, and has for its object to provide such a machine that is not only highly efficient in its action but economical to build, compact and easy to adjust, with few parts subject to wear and to get out of order.

To the above end, the invention consists of the novel devices and combinations of devices hereinafter described and defined in the claims.

In the accompanying drawings, which illustrate the invention, like characters indicate like parts throughout the several views.

Referring to the drawings,

Figure 1 is a right side elevation of the improved grain separator;

Fig. 2 is a view in central vertical section; and

Fig. 3 is a fragmentary detail view in section of the feed hopper and feed roll.

The frame of the improved separator includes four legs arranged in front and rear pairs 4 and 5, respectively. The legs of each pair are rigidly connected at their lower ends by a relatively wide transverse board 6. To give stability to the frame, the two legs 4 and 5, on each side of the machine, are arranged in converging relation. The upper ends of the legs 4 and 5 are rigidly connected by bolting the same to the sides of a feed hopper and also by the use of transverse tie rods 7'.

The two boards or transverse members which constitute the bottom of the hopper 7 have substantially the same width and inclination and are spaced at their lower adjacent edges to afford a feed opening 8 therebetween. It will be noted that the inclination of the bottom members of the hopper 7 is such as to cause the materials placed in the hopper to be separated to slide, under their own weight, into the feed opening 8, and thereby cause a constant feed. It will also be noted that the bottom hopper member, at the front of the machine, is cut away at 9 to increase the width of the feed opening 8.

A feed roll 10 is located under the feed opening 8 with its upper face extending therein. This feed roll 10 is secured to a shaft 11, the ends of which are extended through apertures in the sides of the hopper 7 and journaled in bearings 12 secured to the outer faces of said sides. Circumferentially spaced ratchet teeth-like channels 13 are cut in the periphery of the feed roll 10, for a purpose that will presently appear.

Underlying the feed opening 9, is a feed gate 14 held for sliding movement toward and from the feed roll 10 by guide blocks 15 secured to the inner faces of the sides of the hopper 7. It is important to note that the upper face of the feed gate 14 is located on a radial line projecting from the feed roll 10. By thus mounting the feed gate 14, the narrowest opening between said gate and the feed roll 10 is at the upper edge of said gate, so that if the materials are of such size as to pass therebetween, they will not be crushed by the feed roll. To further assist in releasing the materials that pass between the feed roll 10 and feed gate 14, the lower edge of said gate is preferably beveled, as shown.

For holding the feed gate 14 in predetermined set positions and for adjusting the same, there is rigidly secured to the intermediate portion of said gate an upwardly and radially projecting stem 16, the free end of which is screw-threaded. Said free end of the stem 16 projects through apertures in the prongs of a U-shaped bracket 17 secured to the under side of the overlying bottom member of the hopper 7. Mounted on the screw-threaded end of the stem 16 and located between the prongs of the bracket 17, is a thumb-nut 18, provided for imparting an endwise movement to the stem 16, and thereby adjust the feed gate 14, with respect to the feed roller 10.

Mounted in the machine frame, at the front thereof, is a fan casing 19 having a long rearwardly projecting throat 20. This fan casing 19 and its throat 20 are located between and rigidly secured to a pair of laterally spaced bars 21, the rear end portions of which are secured to the rear pair of legs 5 by a pair of pivot bolts 22. A pair of nut-equipped bolts 23 are inserted from the inside of the fan casing 19 through alined bores formed in said casing and bars 21 and through vertically disposed slots 24 in the front pair of legs 4. Obviously, by tightening the nuts on the bolts 23, the forward ends of the bars 21 may be frictionally clamped against the inner facing of the front legs 4. By loosening the nuts on the bolts 23 to release the bars 21, said bars may be moved on their pivots 22 to change the elevation of their front ends, for a purpose that will presently appear. Mounted in the fan casing 19, is a fan 25, the shaft 26 of which is journaled in bearings 27 secured to the upper edges of the bars 21.

Rigidly secured to the projecting right-hand end of the shaft 11, is a large sprocket wheel 28 having a hand crank 29, the arm of which is detachably secured to said wheel by a pair of nut-equipped bolts 30. In storing or shipping the machine, the hand crank 29 may be removed from the sprocket wheel 28, turned end to end, and again secured to said wheel by the bolts 30 with its hand piece extending between certain of the spokes of the wheel and under the hopper 7. In this position of the hand crank 29, the same is entirely out of the way and, at the same time, it locks the sprocket wheel 28 against turning movement. A sprocket chain 31 is arranged to run over the sprocket wheel 28 and a small sprocket wheel 32 secured to the right-hand end of the fan shaft 26. On the other end of the fan shaft 26, is a second sprocket wheel 32', for a purpose that will presently appear.

Located between the hopper 7 and fan casing 19, is a shoe 33, the front end of which is suspended from the hopper 7 by a pair of links 34, the upper ends of which are pivoted to the sides of said hopper and the lower ends of which are pivoted to the sides of said shoe. The rear end of the shoe 33 is supported by the upper or short ends of a pair of vertically disposed levers 35. These levers 35 are intermediately pivoted to bearings 36 secured to the outer faces of the bars 21 and their upper ends are pivoted to bearings 37 secured to the outer faces of the sides of the shoe 33. Mounted in the shoe 33, is a downwardly and forwardly inclined upper screen pan sieve 38, and it is important to note that said sieve is oblique to the direction of the movement of said shoe, for a purpose that will presently appear. The receiving end of the sieve 38 is located directly under the discharge opening between the feed roll 10 and feed gate 14.

Materials to be separated, in passing over the upper sieve 38, are precipitated onto a rearwardly inclined imperforate deck 39 carried by the shoe 33. The closed front end of the shoe 33 prevents materials, in passing from the sieve 38 to the deck 39, from being discharged through the front end of said shoe. Dust and small foul seeds screened through the sieve 38 are caught in a pan 40 carried by the shoe 33 and discharged therefrom through the left-hand side of the machine. From the deck 39, materials deposited thereon by the sieve 38 are delivered to scalping sieves 41 constructed in a solid gang and mounted in the shoe 33. It is important to note that the sieves 41 are located in planes substantially parallel to the movement of the shoe 33. On the bottom of the shoe 33, is an imperforate deck 42, the delivery end of which terminates under the receiving end portion of the lowermost sieve 41.

The rear end of the top plate of the fan casing throat 20 terminates substantially under the delivery end of the deck 42 and is curved slightly downward to afford a deflecting flange 43, the purpose of which will presently appear. Extending upward and forward from the deflecting flange 43, is a deflecting board 44 secured to the bars 21. Supported on the side of the fan casing 20, is a forwardly inclined deck 45 spaced apart from the flange 43 to afford therebetween a passageway 46 for the grain passing through the gang of sieves 41. Part of the grain precipitated from the deck 42 and lowermost sieves 41 will fall directly through the passageway 46 and the balance thereof will fall on the deflecting board 44 and deck 45 and be directed thereby into said passageway.

Grain entering the passageway 46 will be precipitated onto an underlying adjustable deflector 47 arranged to direct said grain toward the front of the machine. This deflector 47 is pivoted to the sides of the fan casing throat 20 by a pair of alined thumb nut-equipped bolts 48. By tightening the nuts on the bolts 48, the deflector 47 may be frictionally clamped to the sides of the throat 20 in different angular positions. The rear end of the bottom plate of the throat 20 terminates short of the deflector 47 to afford therebetween a relatively wide passageway 49. Said rear end of the bottom plate of the throat 20 is curved upward to afford a deflecting surface 50 for the undershot blast of air from the fan 25 and directs the same onto the deflecting plate 47 and between said plate and the deck 45.

A damper 51, located in the throat 20, is provided for controlling the blast of air from the fan 25. This damper 51 is intermediately secured to a rock shaft 52 journaled in the sides of the throat 20 and having on its outer projecting right-hand end an operating finger 53. This finger 53 is arranged to frictionally engage any one of a plurality of notches formed in a segment 54 secured to the right side of the throat 20 for holding the damper 51 in different set positions.

Underlying the fan casing 19 and its throat 20, is a lower forwardly inclined sieve 55 mounted for reciprocatory movement on a multiplicity of transverse cleaning slats 56. The receiving end of the lower sieve 55 is located directly under the passageway 49. Reciprocatory movement is imparted to the lower sieve 55 from the levers 35 by a rock shaft 57 and a rod 58. The ends of the rock shaft 57 are reduced and mounted in seats formed in the lower or long arms of the levers 35. One end of the rod 58 is inserted through a bore in the rock shaft 57 and adjustably secured thereto by a pair of opposing nuts 59. The other end of said rock shaft 57 is bent laterally upward to form a pivot 60 and mounted in a bore formed in the rear transverse member of the frame of the lower sieve 55. Obviously, the pivot 60 permits free reciprocatory movement of the sieve 55, in case the guides for said sieve are not located in true right angles to the rock shaft 57. One end of a pair of operating bars 61 are connected to the sprocket wheels 32 and 32' by wrist pins 62 and their other ends are pivoted to the lower ends of the levers 35.

*Operation.*

Materials to be separated are placed in the hopper 7, as indicated at $a$, and the movable parts of the machine operated by turning the hand crank 29 in a direction to cause the feed roll 10 and fan 25 to rotate, as indicated by arrows marked on Figs. 2 and 3. Under the rotation of the feed roll 10, a constant and even feed of the materials $a$ from the feed hopper 7 onto the sieve 38 is obtained. The feed roll 10, at each quarter revolution thereof, will take up in one of its channels 13 such materials as rosebuds and the like, that are too large to pass between the periphery of said roll and feed gate 14, and precipitate the same onto the sieve 38, thus preventing an accumulation of such materials in the hopper, which would clog the feed openings 8—9. The feed supply from the hopper 7 may, of course, be regulated, at will, by the feed gate 14.

Materials $a$, deposited on the sieve 38, are subjected to a bouncing action produced by the rise and fall of said sieve, due to its oblique relation to the movement of travel of the shoe 33 by which it is carried. This bouncing action of the materials $a$ on the sieve 38 releases therefrom all dust and small foul seeds, which are screened through said sieve and precipitated into the pan 40, as indicated at $b$ and conveyed thereby to one side of the machine. By thus first separating the dust and small foul seeds from the materials $a$, the machine is free from dust when said materials are subjected to the air blast, after passing through the scalping sieves. It also immediately relieves the machine from handling such materials as removed by the sieve 38. Materials $a$, tailed over the sieve 38, are precipitated onto the deck 39 and the direction of travel thereof reversed by said deck from the front toward the rear of the machine.

From the deck 39, the remaining materials $a$ to be separated are delivered from the gang of sieves 41 and the streams of grain, passing downward through said gang, are indicated at $c$. Stems, straws, sticks, seed pods, large, wild or tame oats scalped from the small seed grains, such as wheat, barley, rye, flax, etc., by the gang of sieves 41 are deposited at the rear of the machine, as indicated at $d$. The streams of grain $c$ from the gang of sieves 41 are deposited on the decks 42 and 45, from whence they are delivered through the passageway 46, with the assistance of the deflector 44, and precipitated onto the adjustable deflector 47. At this time, the grain $c$ is subjected to the undershot blast of air from the fan 25, which removes therefrom all light materials not desirable for seed. Of course, by regulating the damper 51, the amount of such material removed from the grain may be varied, at will. The deflector 43 assists in directing the grain $c$ onto the deflector 47 and also assists, together with the surface 49, in directing the blast of air from the fan 25 into the grain and onto the deflector 47.

From the deflector 47, the grain $c$ is precipitated directly onto the sieve 55, which again changes the direction of the travel of said grain from the rear to the front of the machine. During this precipitation of the grain $c$, any oats therein will fall, large end down, and, in striking the sieve 55, will pass directly therethrough, as indicated at $e$. Any of the oats, which do fall directly through the sieve 55, will find their way therethrough before traveling very far on said sieve. This precipitation of the grain directly onto the sieve 55, instead of onto a deck at the receiving end thereof, is highly important, for the reason that a large amount of the separation takes place immediately, which is essential in the compact form of my present machine. When oats are worked, by an oscillatory movement, from a deck to a sieve, they will be on their sides and it is necessary to cause the same to travel a considerable distance before they are arighted and find their way through the sieve.

By using a screen pan sieve to remove the dust and small foul seeds from the materials to be separated, before they are delivered to the scalping sieves, and, by reversing the direction of travel of the materials, when delivered from said screen pan sieve to the scalping sieves, it is possible to construct a very short and compact machine, which is highly desirable when storing and shipping the machines, owing to the small amount of space they occupy. It is also possible in this construction to place the feed roll 10 in substantially the center of the machine, which, as previously stated, makes it possible to give both bottom members of the hopper substantially the same and a relatively steep pitch, thereby causing the materials in the hopper to slide, under their own weight, into the feed openings 8—9, and thereby insure a constant feed.

The mounting of the sprocket wheel 28 on the shaft 11 of the feed roller 10 is highly important, as said shaft has a bearing at each side of the machine, thus keeping the sprocket wheel 32 on the fan shaft, so that the sprocket chain 31 will not run off from said sprocket wheels. It is now common practice to journal the large driving sprocket wheels of grain separators on short studs secured to one side of the machine. These bearing studs soon will become loose and soon wear, with a result that the sprockets do not aline and it is difficult to keep the sprocket chain thereon.

The above described invention has gone into extensive commercial use and has proven highly efficient for the purpose had in view.

What I claim is:—

1. In a grain separator, the combination with a feed roller, of a fan casing structure mounted for bodily swinging movement toward and from the feed roller, a fan journaled in said casing structure, alined wheels on the shafts of the feed roller and fan, a belt arranged to run over said two wheels, and means for locking the fan casing structure in different adjustments in respect to the feed roller to vary the tension of the belt.

2. In a grain separator the combination with a hopper having a feed opening, of a shoe mounted for vibratory movement, a screen pan sieve and a scalping sieve mounted in said shoe, the former of said sieves being arranged to receive from the feed opening, said two sieves being inclined in opposite directions, the delivery end of the screen pan sieve being extended beyond the receiving end of the scalping sieve, and an imperforate deck forming an extension of the receiving end of the scalping sieve and extending outward of the delivery end of the screen pan sieve to receive the stock delivered thereover.

In testimony whereof I affix my signature in presence of two witnesses.

PATRICK H. VAUGHN.

Witnesses:
CLARA DEMAREST,
EVA E. KÖNIG.

Copies of this patent may be obtained for five cents each, by addressing the "Commissioner of Patents, Washington, D. C."